United States Patent [19]

Sirven

[11] Patent Number: 5,058,868
[45] Date of Patent: Oct. 22, 1991

[54] SHOCK ABSORBER WITH LOAD COMPENSATION

[76] Inventor: Jacques Sirven, 34, Rue de l'Orangerie, F-78000 Versailles, France

[21] Appl. No.: 445,142

[22] Filed: Dec. 4, 1989

Related U.S. Application Data

[63] Continuation of Ser. No. 136,783, Dec. 22, 1987, abandoned.

[30] Foreign Application Priority Data

Dec. 30, 1986 [FR] France ................................ 86 18371

[51] Int. Cl.⁵ ............................................. B60G 11/32
[52] U.S. Cl. .................................... 267/259; 188/299; 267/34; 267/35; 267/64.16; 267/64.21; 267/64.26; 267/152; 267/220; 267/DIG. 1; 280/697; 280/710; 280/712; 280/714
[58] Field of Search ............. 267/34, 35, 64.16, 64.26, 267/64.27, 64.21, 127, 152, 268, 220, DIG. 1, 259; 280/697, 710, 712, 714, DIG. 1; 188/299

[56] References Cited

U.S. PATENT DOCUMENTS

| | | | |
|---|---|---|---|
| 1,198,643 | 9/1916 | Liebau | 267/64.26 X |
| 3,145,985 | 8/1964 | DeCarbon | 267/64.16 |
| 3,178,167 | 4/1965 | Menar | 280/710 X |
| 4,054,277 | 10/1977 | Sirven | 267/35 |
| 4,478,396 | 10/1984 | Kawaura | 267/220 |
| 4,688,774 | 8/1987 | Warmuth, II | 267/152 A |
| 4,720,085 | 1/1988 | Shinbori et al. | 267/64.26 X |

FOREIGN PATENT DOCUMENTS 1361947 7/1974 United Kingdom ................ 280/710

Primary Examiner—George E. A. Halvosa
Attorney, Agent, or Firm—Beveridge, DeGrandi & Weilacher

[57] ABSTRACT

A shock absorber for automobile vehicle suspension comprises a cylinder containing a hydraulic fluid, a piston defining a first chamber and a second chamber in the cylinder, and a rod which extends through the second chamber and is connected to the piston. A hydraulic fluid reservoir is able to communicate with the first chamber via a restriction during a rapid compression movement. A control valve is capable of opening a fluid passage between the first and second chambers. The control valve is subject on one hand to the pressure of hydraulic fluid in the first chamber tending to open the valve and, on the other hand, to the actions tending to close the valve, of a return spring and of substantially constant pressure of a fluid contained in a reference chamber, one wall of which is movable with the control valve. An external compensation casing, integral with the rod, grips the shock absorber in sealed manner, and the compensation casing is connected by a pipe to an external source of variable pressure.

43 Claims, 9 Drawing Sheets

SHOCK ABSORBER WITH LOAD COMPENSATION

This application is a continuation of application Ser. No. 07/136,783, filed Dec. 22, 1987, now abandoned.

The subject of the present invention is a shock absorber for automobile vehicle suspension, comprising means permitting compensation for the load applied to the suspension of the vehicle so as to obtain an optimum operation of the shock absorber.

Shock absorbers have already been described in French patents 74 34 286 and 78 02 054 in which the damping force decreases when the speed of movement of compression exceeds a predetermined limiting value. For this purpose, the shock absorbers described in these patents comprise a control valve able to open a passage to hydraulic fluid between the two chambers defined by a piston in a cylinder, when a rapid movement of compression exceeds a predetermined speed. The control valve is subject to the substantially constant pressure of a fluid, preferably a gas, contained in a reference chamber one wall of which is movable with the control valve. The control valve, preferably, is fitted directly in the moving piston, in which case the shock absorber is in the shape of a single tube shock absorber. In another method of construction, the control valve may be placed in a fixed block mounted inside an additional cylindrical tube which surrounds the cylinder, the shock absorber then being in the shape of a dual tube shock absorber.

In a preferred method of construction, the shock absorber is mounted via a distortable resilient component. Due to this improvement, the resilient component is first of all compressed when the increase in the speed of movement of the rod per unit of time is very high, which causes an increase in the volume of the components immersed in the cylinder thus leading to movement of the control valve before the damping force reaches its predetermined maximum value.

These shock absorbers, such as have been described, do not comprise means enabling the variation of the load applied to the suspension of the vehicle to be taken into account thus the operation of these shock absorbers may happen to be upset.

In addition, load compensation devices for automobile vehicle shock absorbers are known in which the addition of a volume of gas is provided external to the shock absorber inside of which the shock absorber may move in its entirety, the volume of gas acting as a spring. Thus, to compensate for the load, it is possible to determine the height of the body of the vehicle in relation to the ground by an appropriate sensor and to vary the pressure of the volume of gas, for example by means of a pump and a release system with or without a reservoir, the regulation being designed to maintain the height of the body of the vehicle constant in relation to the ground.

The subject of the present invention is a shock absorber which, while retaining the operating characteristics leading to a reduction in the damping force above a certain speed of compression, enables the operating characteristics to be held constant irrespective of the load applied to the vehicle. In this way, the characteristics of the suspension do not depend, for example, on the number of passengers or the amount of baggage carried by the vehicle.

The subject of the invention also is a particular adaptation of the means of compensation of the load to a shock absorber of the type mentioned earlier, comprising a control valve subject to the action of the substantially constant pressure of a fluid contained in a reference chamber so as to permit the reduction of the damping force during a rapid movement of compression of the shock absorber piston.

Again, the subject of the invention is a particular adaptation of such a means of load compensation to a shock absorber of the type mentioned earlier, comprising a resilient component capable of leading to a reduction of the useful volume of the shock absorber causing the opening of the control valve during a sudden movement of compression, the means of compensation of the vehicle load enabling the forces exerted on this resilient component to be balanced out or the distortion characteristics of this resilient component to be modified to act on the operation of the shock absorber.

Also, the subject of the invention is the use of such shock absorbers with load compensation for an automobile vehicle suspension devoid of springs, the shock absorber ensuring the entire suspension on its own.

The shock absorber for automobile vehicle suspension according to the invention, comprises a cylinder containing a hydraulic fluid, a piston actuated by a rod defining a first chamber and a second chamber in the cylinder, the said second chamber containing the rod. A reservoir of hydraulic fluid is able to communicate with the first chamber via a restriction. A control valve is mounted in the shock absorber and is capable of opening a passage for fluid between the first and the second chamber during a rapid compression movement, the said control valve being subject on the one hand to the pressure of the hydraulic fluid present in the first chamber tending to open the valve, and on the other hand to the action tending to close the valve of a return spring and of the substantially constant pressure of a fluid contained in a reference chamber one wall of which is movable with the control valve. Moreover, the shock absorber has an external compensation casing integral with the rod of the shock absorber and gripping the shock absorber in sealed manner, the compensation casing being connected to an external source of variable pressure by a pipe.

In a preferred method of construction, the fluid present in the reference chamber is a gas and the hydraulic fluid reservoir also contains a gas, possibly separated from the fluid by a flexible diaphragm or a movable piston. The external compensation casing, the reservoir and the reference chamber are thus placed in communication.

In a variation, the external compensation casing contains in a first part a gas, the pressure of which is variable due to the action of an external means and, in a second part, hydraulic fluid possibly separated from the gas by a flexible diaphragm or a movable piston. The second part of the compensation casing is in communication with the reservoir of hydraulic fluid. The reference chamber acting on the control valve may, as far as it is concerned, either be in communication with the first part or with the second part of the external compensation casing. The reference chamber may contain either a gas or a fluid which is always determined by its pressure, the reference pressure acting on the control valve.

In a preferred method of construction of the invention, the shock absorber comprises, furthermore, a resilient pad by means of which the cylinder is fixed. The resilient pad is fixed inside the shock absorber so as to lead to a reduction in the useful volume of the shock absorber, causing the opening of the control valve during a sudden compression movement. During such a compression movement, in these conditions, the damping force is reduced by the simple fact of the opening of the control valve due to the action of the distortion of the resilient pad. In this method of construction, the pressure of the gas present in the external compensation casing in communication with the reservoir also acts on the resilient pad so that a greater or lesser compensation is obtained depending on the load applied on the vehicle, without however modifying the load exerted on the resilient pad of the shock absorber mounting in the same proportions. It is also possible by a suitable choice of the section of the resilient pad on which the pressure of the hydraulic fluid is exerted to adapt to the desired value, the load exerted on the resilient pad by the pressure of the gas being present in the compensation casing communicating with the reservoir. It is in this way that the section of the resilient pad on which the pressure of the hydraulic fluid contained in the reservoir is exerted may be chosen equal to, less than or more than the useful section of the compensation casing. By this means, it becomes possible to modify the operation of the whole of the shock absorber, by making the characteristic curve of the resilient pad vary and this in an extremely simple way because it is sufficient to place the external compensation casing in communication with the reservoir and the reference chamber.

In the case of an application of the shock absorber according to the invention to a suspension of the MacPherson type, one may consider mounting the resilient pad eccentric in relation to the axis of the useful section of the compensation casing so as to create a couple enabling the opposing couple to be compensated for due to the offset of the wheel of the vehicle in relation to the axis of the strut.

The sealing between the external compensation casing and the shock absorber may be ensured by a circular sealing ring permitting a relative movement of the shock absorber in translation in relation to the external compensation casing.

In a preferred method of construction, two sealing rings are used leaving a free annular space between them which is then filled with hydraulic fluid and placed in communication with the external compensation casing. In this way, the pressure acting on each of the sides of the sealing ring separating the compensation casing and the aforementioned annular space is perfectly in balance which considerably improves the operation of this sealing ring.

The external compensation casing may, as an alternative, also be made of a non-extendable flexible sleeve one open end of which is fixed to the shock absorber in sealed manner and may roll on it during the compensation of the load.

The invention will be understood better by the study of several methods of construction taken as non-limiting examples and illustrated by the attached drawings in which.

Figure 8:
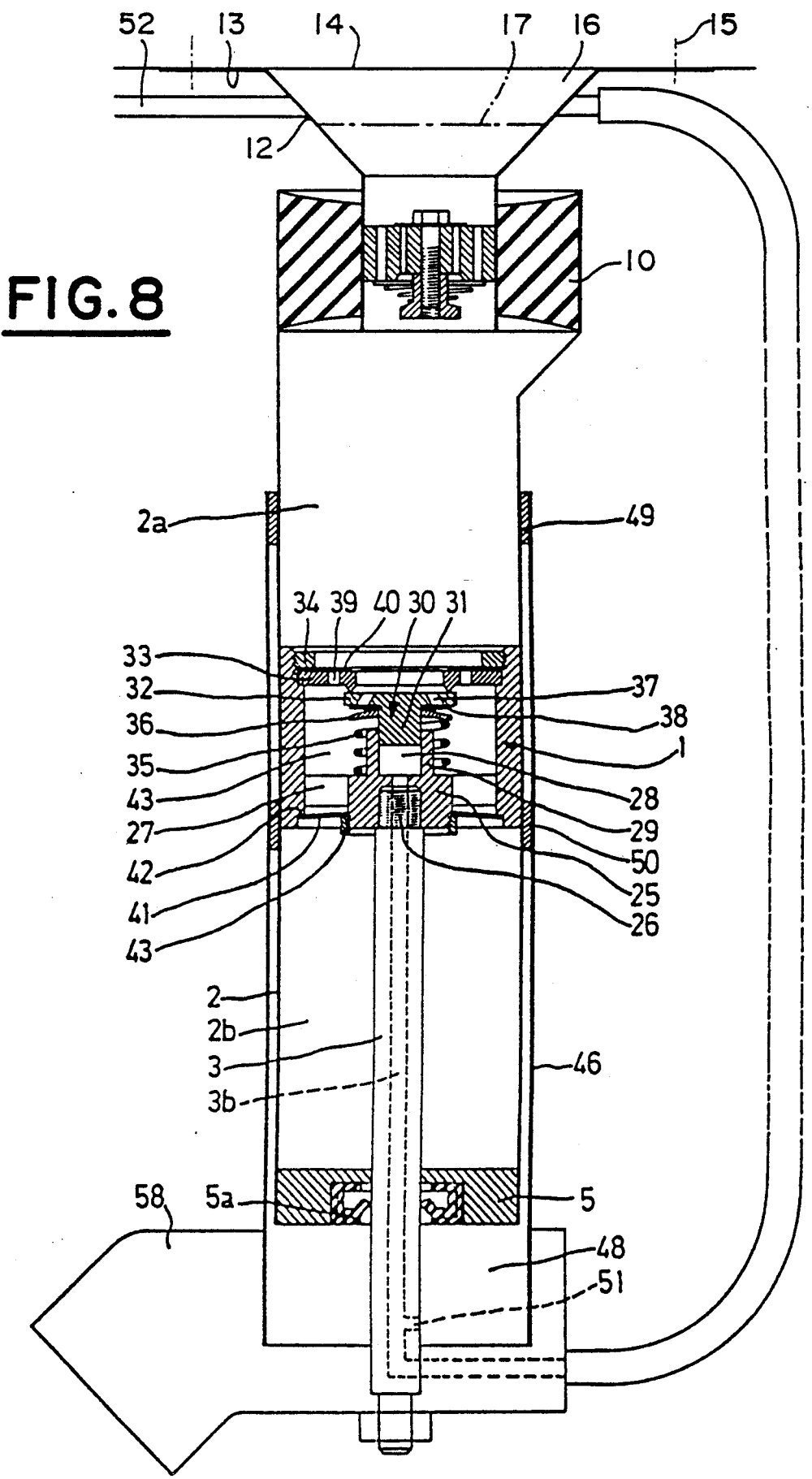
Figure 9:
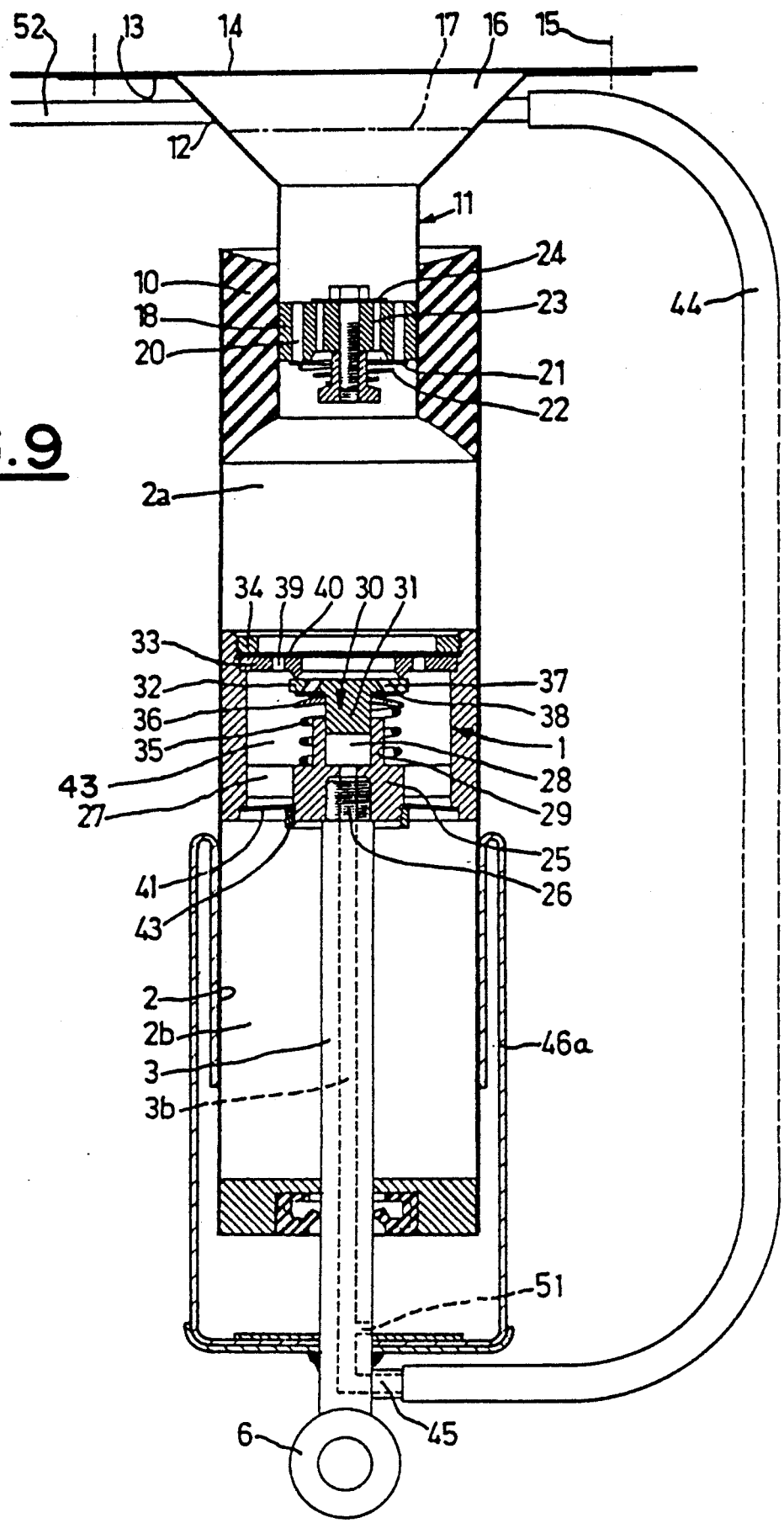

FIG. 7 again illustrates another method of construction of a shock absorber according to the invention, showing the use of a flexible sleeve for the compensation casing and the mounting of a shock absorber with the rod directed upwards in a dual tube type version of shock absorber;

FIG. 8 illustrates another method of construction of a shock absorber according to the invention in which an elastic member is inside the shock absorber and eccentric thereto; and FIG. 9 illustrates another embodiment of the invention in which the piston is provided with a control valve, an elastic member defines an end of a first chamber of the shock absorber, and a flexible sleeve rolls on the shock absorber and forms the external compensation casing.

Figure 1:
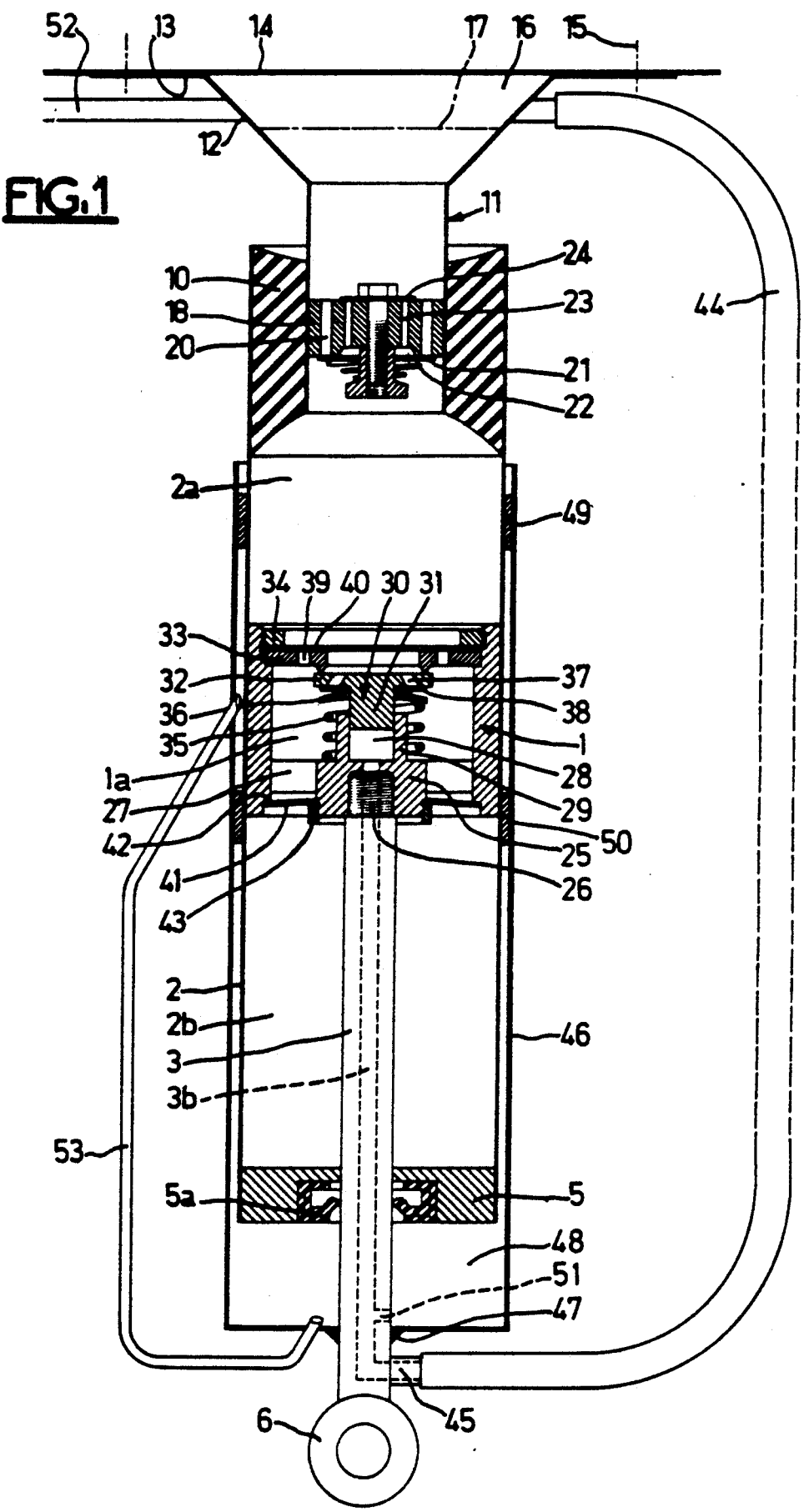
FIG. 1 illustrates a shock absorber of the single tube type according to the invention, the shock absorber rod being placed towards the bottom.

The shock absorber of the invention, such as is shown on FIG. 1, comprises a piston 1 sliding inside a cylinder 2 and defining a first chamber 2a inside it, at the end of the piston 1 and a second chamber 2b which encloses the rod 3 made integral with the piston 1. The cylinder 2 is integral at its bottom end with a closure part 5 having a central bore fitted with a sealing ring 5a through which the rod 3 of the piston slides. An attachment ring 6 located at the bottom end of the rod 3 permits the rigid fastening of the rod 3, for example to a wheel or a suspension arm of a vehicle (not shown). A ball joint mounting may also be considered. The shock absorber functions with the rod directed towards the bottom.

The top end of the cylinder 2 is closed by a resilient pad 10 of elastomer or of a similar material, integral with the internal wall of the cylinder 2 and which has a central bore to the inside of which is fixed a reservoir of hydraulic fluid 11 whose upper part 12 opens out and comprises a flange 13 enabling its rigid fixing to the body 14 of the automobile vehicle by bolts 15. The reservoir 11 encloses a gas 16 in its top part, the level of the fluid being shown at 17. The gas 16 may be in direct contact with the hydraulic fluid as illustrated on FIG. 1 or they may be separated one from the other by any appropriate means such as a flexible diaphragm or a floating piston.

A separating component 18 is fixed to the inside of the reservoir 11, the object of which is to separate the first chamber 2a and the actual reservoir 11. The separating component 18 contains substantially axial passages 20 which may be blocked by a spring washer 21 playing the part of non-return valve and pushed upwards by a spring 22 so as to allow a circulation of the hydraulic fluid from the reservoir 11 up to the first chamber 2a. The separating component 18 comprises, moreover, substantially axial passages 23 working together with a non-return valve 24 of set stiffness to permit a circulation of hydraulic fluid in the opposite direction.

The non-return valve 21 is selected with a suitable flexibility to offer only a very weak resistance to the passage of the fluid from the reservoir 11 towards the first chamber 2a. The stiffness of the non-return valve 24 is selected to be greater so as to ensure the operation of the shock absorber during a movement of compression of the rod 3 as will be seen further on.

The piston 1 is made in the form of a hollow component having a central core 25 fitted with a tapped hole accepting the threaded end 26 of the rod 3 and integral with the side walls of the piston 1 by means of radial webs 27 leaving a free space between them for the hydraulic fluid. The central core 25, moreover, has a space playing the part of chamber of reference 28, laterally demarcated by an annular sleeve 29 integral with the core 25 of the piston 1. The reference chamber 28 is filled with a fluid which is, in the method of construction illustrated on FIG. 1, a gas at a substantially constant pressure. The reference chamber 28 is demarcated in movable manner at its top part by the bottom surface of the control valve 30 which is in the form of an auxiliary piston 31 able to slide sealingly inside the housing 28. The control valve 30 also has a top plate 32 of larger diameter coming into sealing contact by its top face with a seat integral with a washer 33 fixed to the side walls of the piston 1 by a locking ring 34.

The control valve 30 is pushed in the direction of its closure against the seat of the washer 33 by the action of a spring 35 which rests on the one hand on an edge of the central core 25 of the piston 1 and, on the other hand on an annular cup 36 surrounding the bottom part 31 of the control valve 30. The plate 32 of the control valve 30 has holes 37 inclined in relation to the axis of the device and working together with an non-return valve 38 held against the bottom surface of the plate 32 by the cup 36 and the spring 35 so as to authorize a limited passage of fluid between the first chamber 2a and the second chamber 2b. The washer 33 also has some drilled holes 39 working together with a non-return valve 40 held by being gripped between the washer 33 and the locking ring 34 so as to authorize a limited passage of fluid from the second chamber 2b towards the first chamber 2a.

In the method of construction illustrated, a valve 41 creating an additional restriction is mounted adjacent to the front end of the piston 1 opposite to the control valve 30. The valve 41 is made up of a thin annular flexible part and is just pressed by its external periphery on a shoulder 42 made in the side wall of the piston 1 so as to allow a restricted passage of the fluid coming from the first chamber 2a via the internal space 10 of the piston 1 in the direction of the second chamber 2b. The internal periphery of the valve 41 just rests on the edge which constitutes the nut 43 screwed on the central core 25 of the piston 1.

It follows that there is a possibility of restricted passage for the fluid from the second chamber 2b towards the internal space 1a. The valve 41 is able to operate in both directions by opening adjacent to its external periphery or adjacent to its internal periphery alternatively.

The reference chamber 28 is placed in communication with the top part 16 of the reservoir 11 by a flexible pipe 44 connected by the hole 45 to the bottom end of the rod 3 which has an axially drilled hole 3b made along the entire length of the rod 3 and opening out in the reference chamber 28.

An additional cylindrical tube 46 constitutes an external compensation casing and is fixed to the bottom end of the rod 3 in rigid manner, for example by welding at 47. The bottom part of the compensation casing 46 defines a compensation chamber 48 inside of which the cylinder 2 is able to move. The sealing of the sliding movement of the cylinder 2 in relation to the compensation casing 46 is ensured by two sealing rings 49 and 50 which may be mounted fixed in the external compensation casing 46 or, on the contrary, be mounted on the external periphery of the cylinder 2, in which case the internal wall of the compensation casing 46 is machined to suit. The sealing ring 49 may also be mounted fixed on the tube 46 whereas the sealing ring 50 is fixed to the outside of the cylinder 2. Of course, other methods of construction may be foreseen to ensure the sealing for example by one sealing ring only.

A hole 51 places the axially drilled hole 3b in communication with the compensation chamber 48. Furthermore, a pipe 52 opens out into the top zone 16 of the reservoir 11 and is connected to an external source of variable pressure not shown on the figure.

In this way, it becomes evident that the gas present in the top part 16 of the reservoir 11, in the compensation chamber 48 and in the reference chamber 28 is at the same pressure. In fact, all these parts of the shock absorber communicate between each other via the pipe 44, the axially drilled hole 3b and the hole 51.

The variation of the pressure of this gas may be controlled by a device for compensation of vehicle load comprising, for example, a sensor for the height of the body in relation to the ground and a pumping installation.

The sealing between the external compensation casing 46 and the cylinder 2 may be improved again in the method of construction illustrated on FIG. 1, by the fact that the annular space defined between the two sealing rings 49 and 50 is filled with hydraulic fluid and communicates with the bottom zone of the compensation chamber 48 by means of the pipe 53. In these conditions, a balance of pressure appears between the top and bottom faces of the sealing ring 50 so that its sealing efficiency is seen to become considerably improved. Furthermore, the sealing of the top ring 49 is also improved by the fact that the face subjected to the greatest pressure is bathed in fluid.

The control valve 30 is subjected to the action of four different forces during operation of the shock absorber illustrated on FIG. 1:

the strength of the spring 35 which tends to close the valve 30;

the pressure reigning in the chamber 2a which acts on the surface of the plate 32 of the control valve 30 in a direction which tends to open the said control valve;

the substantially constant pressure of the gas present in the reference chamber 28 which acts on the surface of the auxiliary piston 31 and which tends to close the control valve 30;

and finally the pressure of the fluid acting on the remaining bottom surface of the plate 32 tending to close the control valve 30.

The hydraulic fluid is able to pass from the chamber 2a to the chamber 2b by passing through the drilled holes 37, the non-return valve 38 as well as the additional valve 41 which opens adjacent to its external periphery for low speeds of compression of the rod 3.

When the speed of compression of the rod exceeds a predetermined limiting value which also corresponds to a limiting value for the pressure reigning in the first chamber 2a, the valve 30 opens, leaving a much larger passage for the fluid coming from the first chamber 2a. The fluid must again pass through the restriction made by the additional valve 41 so that the damping load does not decrease as far as a nil value but remains maintained at a value which depends on the stiffness of the valve 41 and which may be chosen, for example, so as to maintain the minimum value of the damping force at about one third to one quarter of the maximum value of the damping force before opening of the control valve 30. In some instances, of course, this result may be considered as useless. It is then sufficient to eliminate the additional valve 41.

It will be noted that the volume of the additional fluid corresponding to the immersion of the rod 3 in the cylinder 2 escapes towards the reservoir 11 by means of the passages 23 and via the restrictions defined by the non-return valve 24. The stiffness of the valve 24 is thus an important factor in the definition of the characteristics of the shock absorber. In fact, it is the driving pressure of the control valve 30 that depends on the stiffness of this valve 24 and thus the value of the speed of driving in of the rod at the moment of the opening of the control valve. The stiffer the valve 24, the more the valve opens for a low compression speed of the rod 3.

During a reverse movement of the rod 3 corresponding to a release of pressure, the hydraulic fluid passes from the second chamber 2b into the first chamber 2a by means of the internal periphery of the additional valve 41 and the passages 39 defining the restrictions in conjunction with the non-return valve 40. During the same time, a certain amount of fluid present in the reservoir 11 passes through the passages 20 and the restrictions made by the non-return valve 21. It is advantageous to provide for a non-return valve 21 having a relatively wide flexibility in order to obtain the best characteristics in the release operation.

During a sudden compression of the shock absorber, the resilient pad 10 first of all distorts and leads to a reduction of the useful volume of the first chamber 2a before any movement of compression of the rod 3, which leads to an increase in the pressure reigning in the chamber 2a and thus an immediate action on the control valve 30.

When the load applied on the vehicle varies, that is to say that the clearance between the body of the vehicle 14 and the attachment ring varies, it is advisable to be able to maintain the operating characteristics of the shock absorber essentially constant. This is the aim of the device for compensation of the load which acts via the pipe 52. Thus for example, the pressure of the gas carried by the pipe 52 is increased during an increase in the load applied to the vehicle. This results in an increase in the pressure of the gas present in the shock absorber, that is to say at one and the same time in the top part 16 of the reservoir 11, in the compensation chamber 48 and in the reference chamber 28. The increase in the pressure in the compensation chamber 48 leads to a pneumatic spring effect on the cylinder 2 which thus maintains itself more or less in the position of rest illustrated on FIG. 1 irrespective of the load applied to the vehicle.

Moreover, the fact of also subjecting the reservoir 11 to the same increase in pressure has the advantage of also exerting a compensation effect on the resilient pad 10 which enables a balance of applied loads to be obtained on the resilient pad 10 or a calculated difference of these loads to be obtained with the object of achieving a particular modification of the deformation characteristics of the resilient pad according to the structure and the mounting of this pad. It will be understood that a variation in the deformation characteristics of the resilient pad 10 leads automatically to a corresponding variation in the operation of the shock absorber because the deformation of the resilient pad 10 leads to a variation of the useful volume of the first chamber 2a and a corresponding action on the drive of the control valve 30 itself controlling the value of the damping force. In these conditions, it appears that the invention thus permits action on the actual operation of the shock absorber by means of this particular adaptation of the means of compensation for the vehicle load.

In the method of construction illustrated on FIG. 1, the useful section of the compensation chamber 48 is a little greater than the section of the resilient pad 10 subject to the pressure of the hydraulic fluid present in the first chamber 2a.

Figure 2:
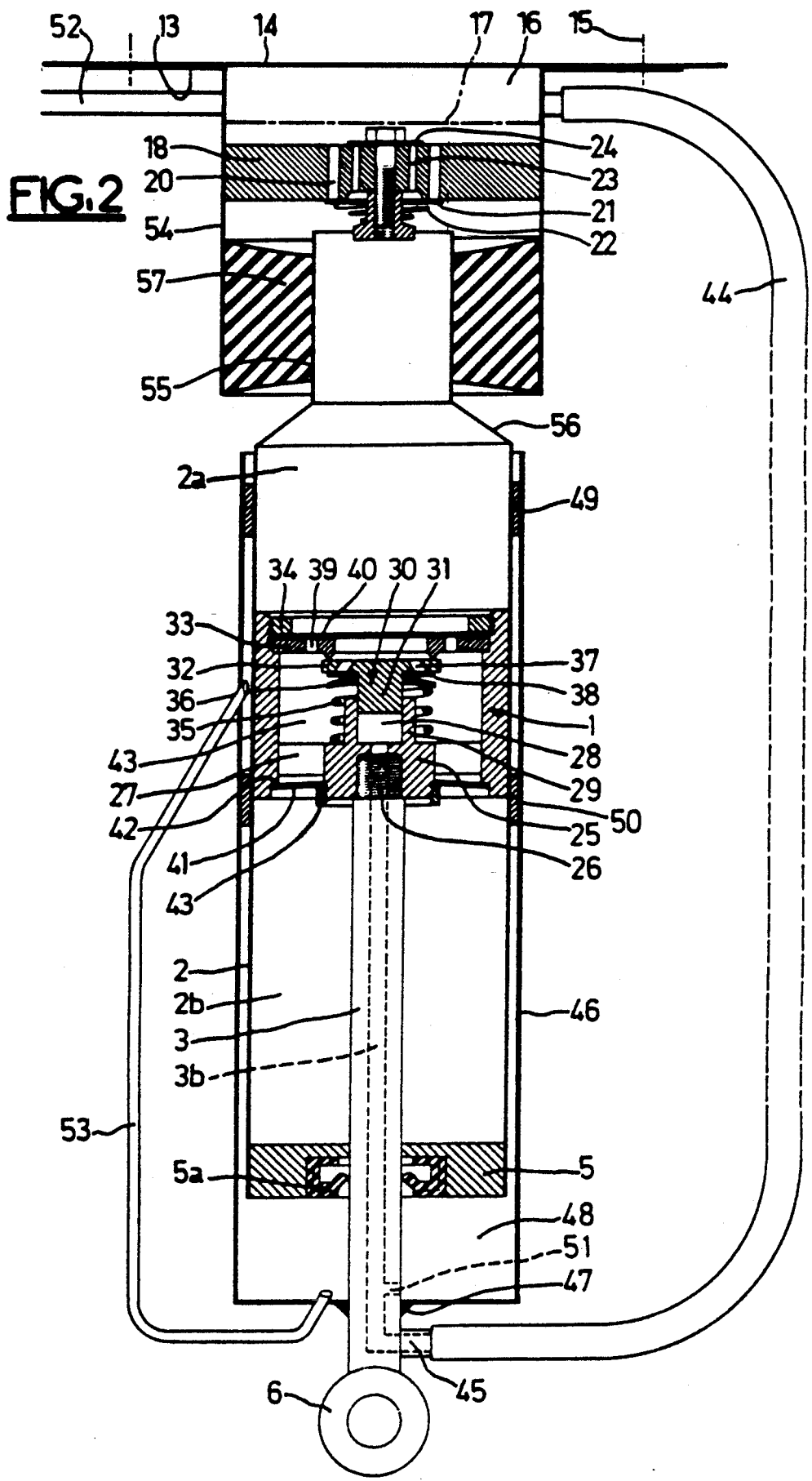
FIG. 2 illustrates a variation of the shock absorber of FIG. 1 in which the reservoir surrounds the top part of the cylinder.

In the method of construction illustrated on FIG. 2 which is identical to that of FIG. 1 apart from the arrangement of the reservoir 11, it has been made, on the contrary, so that the useful section of the compensation chamber 48 is substantially equal to the section of the resilient pad 10 on which the pressure of the fluid present in the reservoir 11 exerts itself.

In the method of construction of FIG. 2, the reservoir fixed to the body 14 of the vehicle has a sleeve 54 surrounding the top end 55 of the cylinder 2 and on the inside of which the separating component 18 is fixed playing the same role as in the method of construction of FIG. 1. The top end 55 has a reduced diameter and is attached to the cylinder 2 by a truncated part 56. The resilient pad 57 is fixed between the top part 55 and the internal surface of the sleeve 54. As previously, this results in a modification of the useful volume of the shock absorber which acts on the drive of the control valve 30.

It will be understood that it would also be possible to modify the method of construction of FIG. 1 by providing a bell-mouthed top end part for the cylinder 2 without modifying the structure of the reservoir 11. In this case, the resilient pad 10 would thus be of a greater external diameter and the useful surface of the compensation chamber 48 would be less than the surface of the resilient pad 10 subject to the action of the pressure of the liquid in the first chamber 2a.

Figure 3:
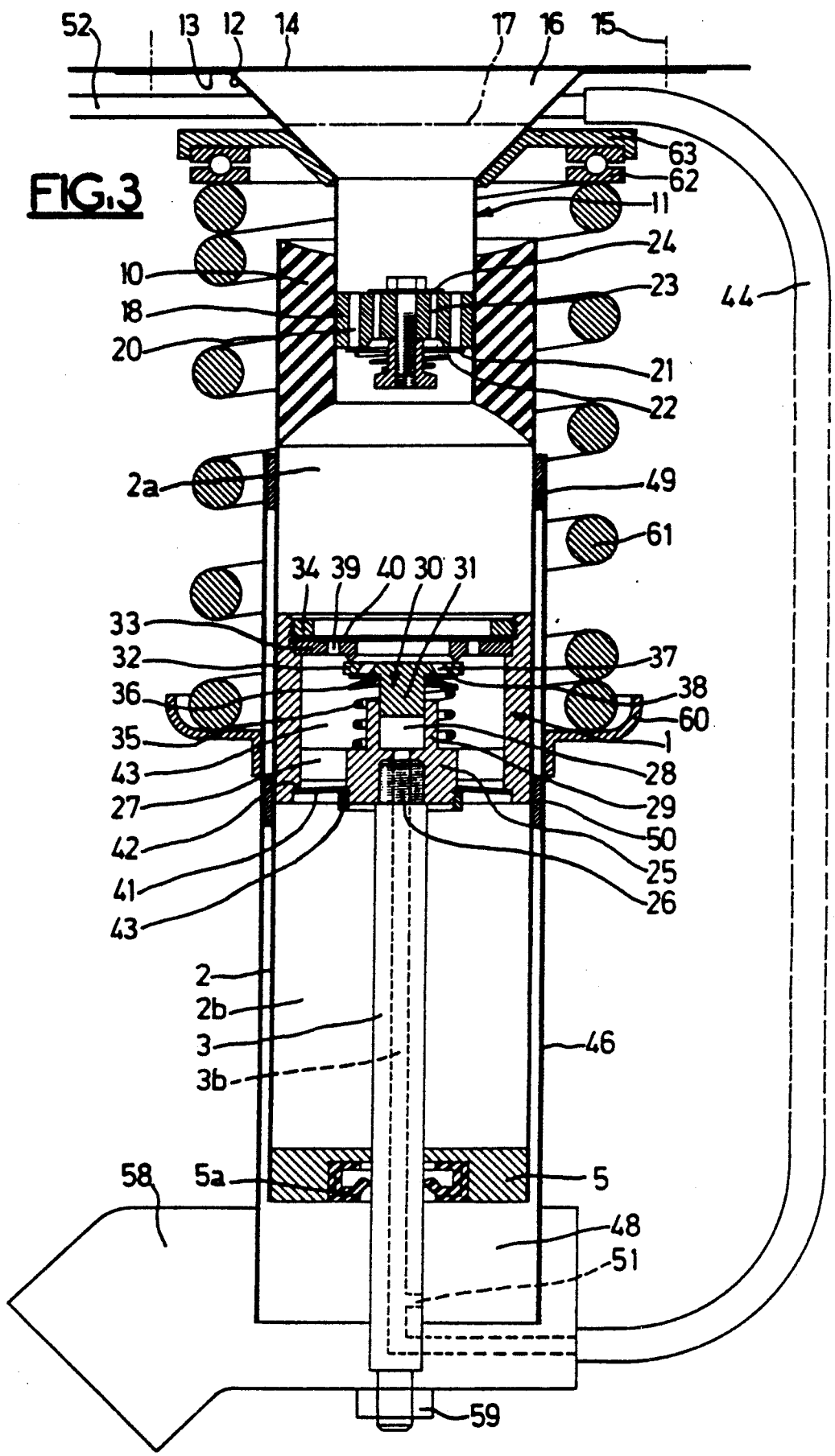
FIG. 3 illustrates the use of a shock absorber similar to that illustrated on FIG. 1, on a Macpherson type suspension for automobile vehicle, having a main spring surrounding the shock absorber in eccentric manner.

The shock absorber of the present invention may be adapted easily to a suspension of an automobile vehicle in which the shock absorber is located inside the main suspension spring. FIG. 3 illustrates a method of construction of the shock absorber according to the invention adapted to such a suspension known as MacPherson, the shock absorber being of the single tube type with the rod directed downwards as in the method of construction of FIGS. 1 and 2. The identical parts have the same references as in the preceding figures.

The external compensation casing 46 is fixed at its bottom part to a component 58 integral with the front or rear stub axle of the vehicle, not shown on the figure. In the same way, the rod 3 of the shock absorber is fixed at its bottom part to the component 58 by means of a nut 59. A thrust collar 60 is fixed, for example by welding, to the external periphery of the external compensation casing 46 adjacent to its middle section. The bottom part of the main spring 61 of the suspension just rests on the collar 60 and works together, moreover, by its top part with a ball thrust bearing 62 which rests on a thrust collar 63 integral with the reservoir 11. The spring 61 may be mounted as illustrated on FIG. 3 with its axis merged with the axis of the shock absorber. In some cases, on the contrary, it is preferable to mount the spring 61 in slightly offset manner in order to create a couple to take up the offset of the wheel of the vehicle in relation to the axis of the strut.

In the method of construction illustrated in FIG. 3, the compensation of the load is made in the same way as in the methods of construction illustrated on FIGS. 1 and 2. The placing in communication of the reference chamber 28, of the compensation chamber 48 and of the top part 16 of the reservoir 11 by the pipe 44 is also found here. In this method of construction, the annular space between the sealing rings 49 and 50 is not filled with fluid in order to illustrate such a variation. Of course, it will be understood that it would be possible to provide some fluid in this annular space to improve the sealing as has already been described with reference to the earlier figures. The guiding rings 49 and 50 could also be mounted differently. The ring 49 could be integral with the external casing 46 and the ring 50 integral inside of the cylinder 2 and mounted in the bottom part of the cylinder 2, the casing 46 being machined internally and the cylinder 2 machined externally. In this way, a very good guiding of the strut and a better resistance to the tilting couple created by the zone would be obtained.

Figure 4:
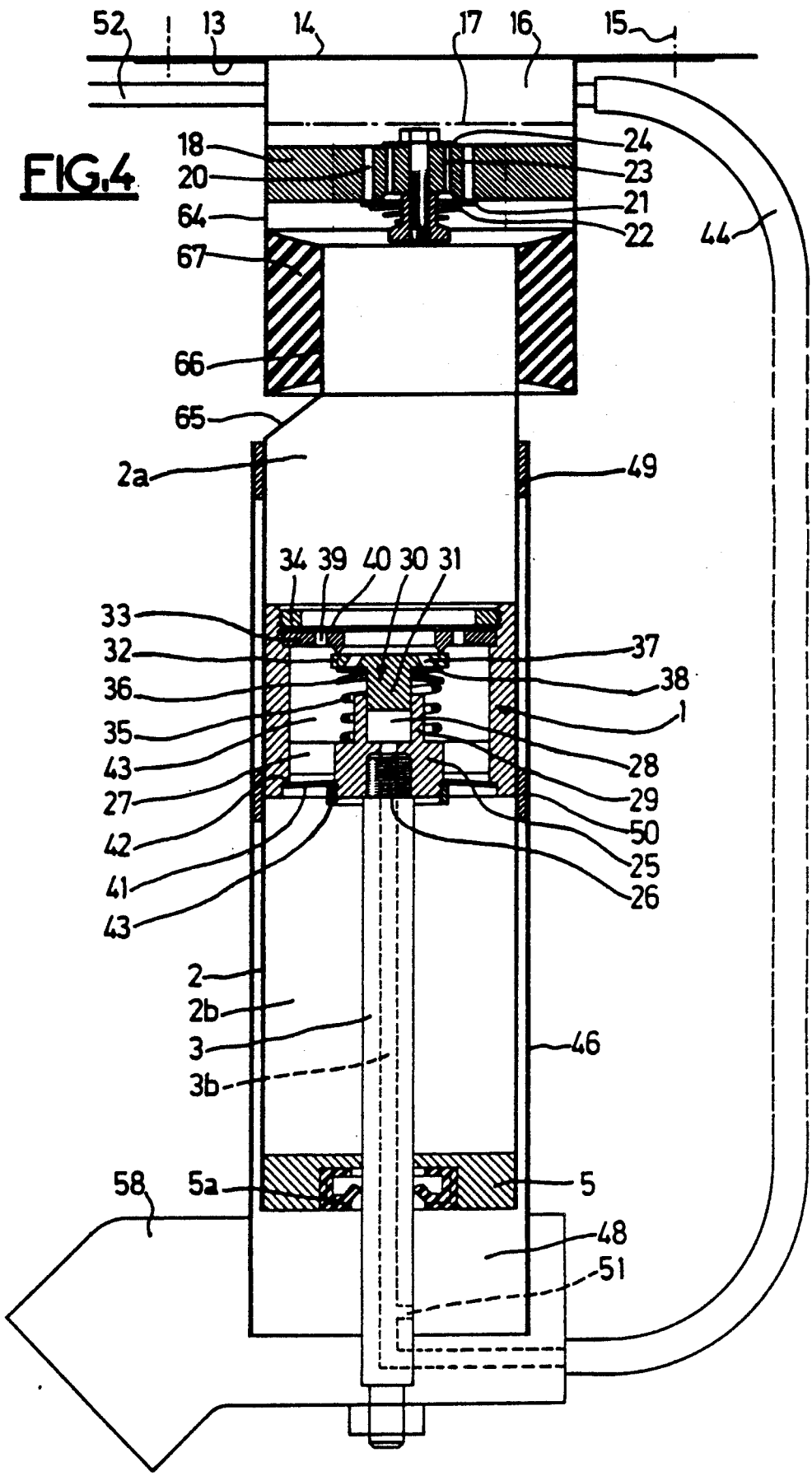
FIG. 4 is a variation of FIG. 3 showing an eccentric layout of the reservoir enabling a couple to be obtained and to eliminate the main spring in the method of construction of FIG. 3.

FIG. 4 illustrates a variation of the MacPherson type suspension in which the main spring of the suspension used in the method of construction of FIG. 3 has been eliminated completely and is replaced by the pneumatic spring formed by the compensation chamber 48 itself. Moreover, in this method of construction, it is planned to offset the axis of the reservoir, formed by a cylindrical sleeve 64, in relation to the axis of the shock absorber. For this purpose, the top part of the cylinder 2 has a partially conical setback profile 65 and an end part of reduced diameter 66. The separating component 18 of identical structure to that of the separating component for the preceding means of separation and serving the same purpose is fixed inside the sleeve 64 fixed rigidly to the body of the vehicle as in the method of construction illustrated on FIG. 2. As was the case in the method of construction illustrated on FIG. 2, the resilient pad 67 is mounted here between the end part 66 of the cylinder 2 and the reservoir 64 such that the distortion of the resilient pad 67 causes a variation of the useful volume of the reservoir 64 leading, as has been mentioned previously, to the driving of the control valve 30 in case of a sudden compression movement.

In this method of construction, the suspension is essentially pneumatic and the pressurizing of the shock absorber by the pipe 52 enables the compensation for the load to be made and the suspension of the vehicle to be ensured at one and the same time. The offset mounting of the reservoir 64 and of the resilient pad 67 enables a couple to be obtained for the suspension if this is desired in such a suspension of the MacPherson type. As previously mentioned in this specification, other shock absorbers according to the invention (i.e. the shock absorbers of FIGS. 1-3, 5-7, and 9) may be adapted for and used in a MacPherson type suspension by positioning the resilient pad eccentric to the axis of the compensation casing to create a couple which compensates for the opposing couple caused by the offset of the vehicle's wheel relative to the strut axis. Furthermore, the various disclosed shock absorbers may serve as the entire suspensions for automotive vehicles which are devoid of springs. Of course, on the contrary, the reservoir of the FIG. 4 apparatus could be foreseen to be mounted on the axis of the shock absorber. As in the case of preceding methods of construction, the reference chamber 28 is in communication with the compensation chamber 48 by means of the hole 51 and with the top part 16 of the reservoir 64 by the pipe 44.

Figure 5:
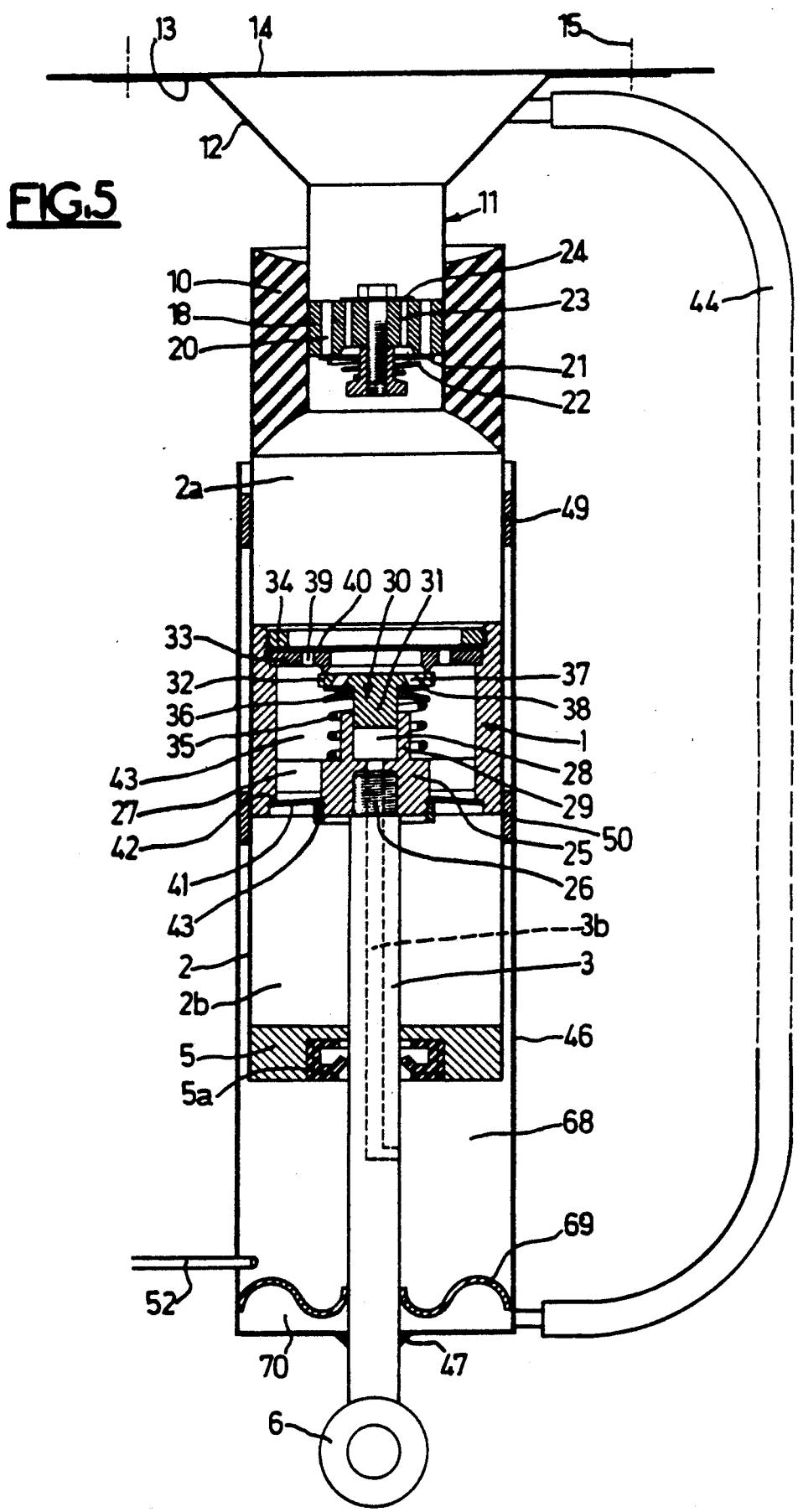
FIG. 5 illustrates a variation of the shock absorber of FIG. 1 in which the reservoir is filled completely with fluid.

In the method of construction shown on FIG. 5 where the identical parts have the same references, the reservoir 11 is filled completely with hydraulic fluid. The bottom part of the external compensation casing 46 comprises a first part 68 which is in communication with an external source of gas under pressure via the pipe 52 which opens out this time in the first part 68 of the external casing 46 and not in the reservoir 11 as was the case in the preceding methods of construction. The first part 68 then is filled with a gas at variable pressure and plays the part of compensation chamber for the load The axially drilled hole 3b of the rod 3 opens out directly into the first part 68 of the external compensation casing 46. In this way, the reference chamber 28 is in communication with the first part 68 and at the same pressure as this latter. The bottom end of the external compensation casing 46 has a flexible diaphragm 69 which separates the first part 68 filled with gas from a second part 70 filled with hydraulic fluid and communicating with the reservoir 11 by means of the pipe 44.

Apart from this difference of structure, the shock absorber of this method of construction operates in the same manner as previously. In fact, the reference chamber 28 contains a gas at a substantailly constant pressure which is that of the compensation chamber formed by the first part 68 of the external casing 46. This pressure is variable according to the load of the vehicle due to the presence of the pipe 52 connected to the system for pressurizing the means of compensation of the load. In this method of construction, the reservoir of hydraulic fluid is formed at one and the same time by the reservoir 11 located at the top part of the shock absorber and by the second part 70 located at the bottom end of the external compensation casing 46. Although a flexible diaphragm 69 has been provided for physically separating the hydraulic fluid present in the external casing 46 from the gas also present there, the elimination of this diaphragm could be foreseen or its replacement by another separation such as a movable piston in so far as the pipe 52 and the axially drilled hole 3b always open out in the first part 68 filled with gas.

In a variation, it would be possible to make the axially drilled hole 3b open out into the second part 70 of the external casing 46. In this case, the reference chamber 28 would then be filled with fluid which would not alter the operating principle of the shock absorber.

Furthermore, in this case if an improvement of the sealing between the external compensation casing 46 and the cylinder 2 is wished , annular space between the two rings 49 and 50 can be connected to the second part 70 of the external casing 46. This annular space is then filled with hydraulic liquid.

Figure 6:
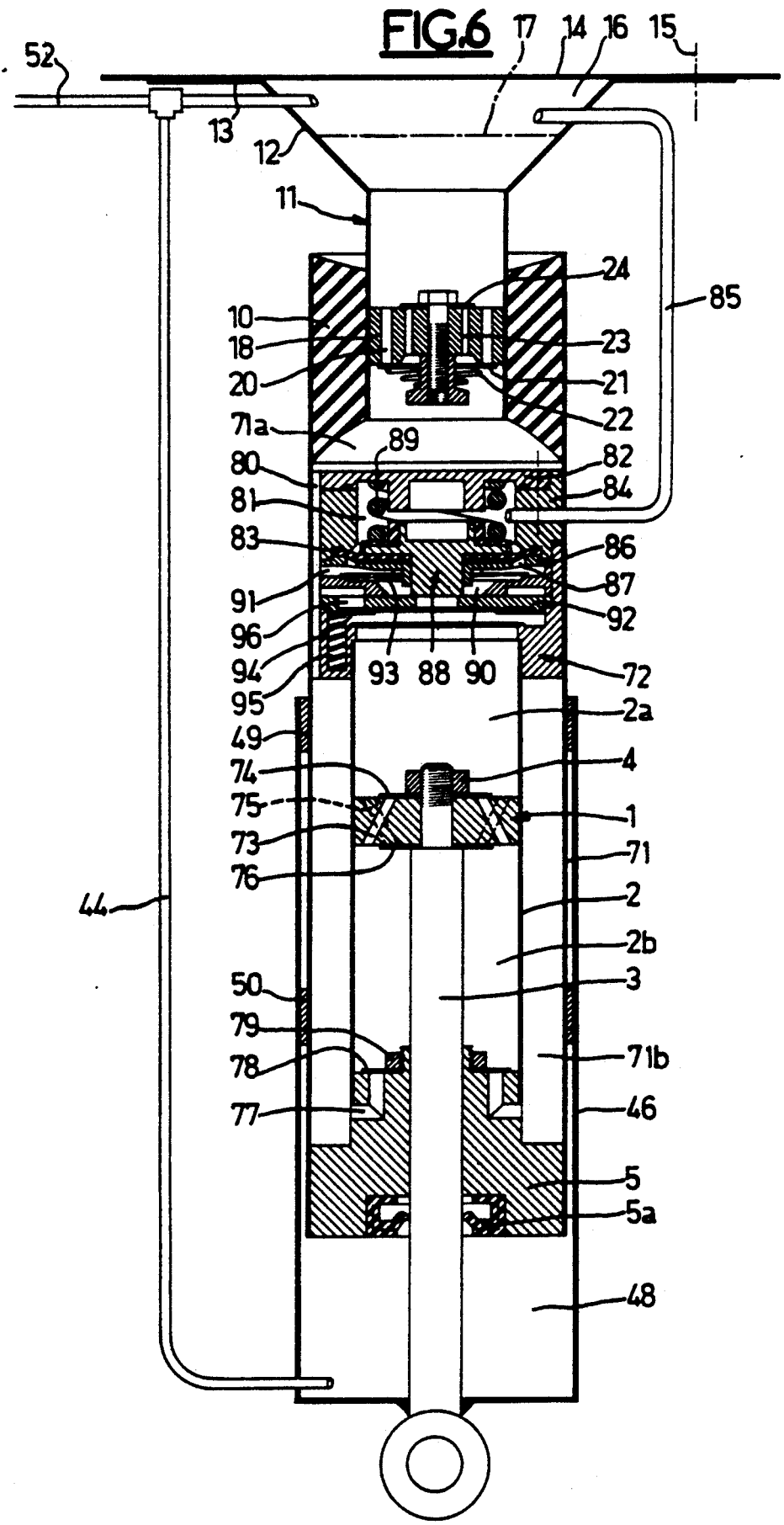
FIG. 6 illustrates another method of construction of a shock absorber of the dual tube type according to the invention, the shock absorber rod being directed towards the bottom.

FIG. 6 illustrates a method of construction of the invention for a dual tube type shock absorber, the rod being directed downwards. In this method of construction where the identical parts have the same references, the cylinder 2 is mounted inside an additional cylindrical tube 71 acting as location for all the components of the shock absorber and integral with the bottom closure part 5. The external compensation casing 46 is mounted so as to surround the cylindrical tube 71, the sealing being ensured as previously by two rings 49 and 50. The top end of the cylinder 2 is integral with a top closure part 72 which is also fixed to the cylindrical tube 71. The elastomer pad 10 is fixed to the inside of the cylindrical tube 71 above the closure part 72. The reservoir 11 is mounted in the same way in the bore of the resilient pad 10 in the top part of the assembly as in the preceding methods of construction. The separating component 18 identical to that illustrated in the method of construction of FIG. 1, separates the top portion 71a of the cylindrical tube 71 and the actual reservoir 11.

In this method of construction, the piston 1 is of massive structure and comprises passages 73 working together with a non-return valve 74 so as to permit a restricted passage of the hydraulic fluid from the second chamber 2b up to the first chamber 2a and to prevent any circulation in the opposite direction. The piston 1 also has some passages 75 working together with a non-return valve 76 to permit a limited circulation of hydraulic fluid from the first chamber 2a to the second chamber 2b and to prevent any circulation in the opposite direction. Passages 77 and a very flexible non-return valve 78 held by a nut 79 are provided in the bottom part 5 to permit the circulation of the hydraulic fluid from the annular chamber 71b defined between the tube 71 and the cylinder 2 towards the second chamber 2b and to prevent it in the opposite direction.

The top closure part 72 is formed by the stacking of a certain number of components, the assembly being held by retaining screws. All these components have an identical profile in plain view, axial passages being provided at the periphery of the part 72 in order to permit the circulation of the hydraulic fluid between the annular chamber 71b and the top part 71a of the cylindrical tube 71.

A reference chamber 81 playing the same part as the reference chamber 28 in the preceding methods of construction is completely closed and defined inside the closure part 72 between a top cover 82 and a flexible diaphragm 83, the side walls of the chamber 81 being defined by an annular component 84. A gas is present inside the reference chamber 81 at a pressure which remains substantially constant during the operation of the shock absorber and is preferably higher than the atmospheric pressure. A pipe 85 external to the shock absorber places the reference chamber 81 in communication with the top part 16 of the reservoir 11 so as to balance the pressures.

The flexible diaphragm 83 is mounted tightened by its external periphery between the annular part 84 and a fixed deflector disc 86 fitted with perforations 87 adjacent to its external periphery. A control valve 88 is mounted inside the reference chamber 81. The control valve 88 has a cylindrical portion similar to a piston which is able to slide inside a cylindrical guiding sleeve which is an integral part of the deflector disc 86. A return spring 89 is also mounted inside the reference chamber 81 and just rests on the one hand, on the internal wall of the cover 82 and on the other hand, on the valve 88 with interposition of a fold of the flexible diaphragm 83. The valve 88 guided by the fixed deflector component 86 is able to move axially inside the reference chamber 81 one wall of which is movable because it is formed partly by the flexible diaphragm 83 and by the valve 88. The pressure of the gas present in the reference chamber 81 as well as the compression spring 89 act on the valve 88 in the direction of its closure. An intermediate space 90 is provided inside the closure part 72 and is demarcated by the flexible diaphragm 83 which forms a top moving wall for the space 90. This intermediate space is in communication with the passages 80 by means of the radial passages 91, that is to say on the one hand with the top part 71a and on the other hand with the annular chamber 71b of the cylindrical tube 71. The intermediate space 90 is demarcated, furthermore, by an annular part 92 which has a central hole playing the role of a seat for the control valve 88. An additional valve 93 separates the intermediate space 90 into two parts and plays the same role as the additional valve 41 of the method of construction of FIG. 1. As previously, in a variation, the additional valve 93 could also be eliminated. A release valve 94 subject to the action of a multiplicity of axial springs 95 works together with passages 96 to permit the passage of the hydraulic fluid from the top part 71a or the annular chamber 71b along to the first chamber 2a of the cylinder during a movement of release.

The compensation chamber 48 located at the bottom part of the external casing 46 is in communication with the top part 16 of the reservoir 11 by means of the pipe 44 as in the preceding methods of construction. The pressurizing of the whole of the shock absorber is made by the pipe 52 connected as previously to a gas pressurizing installation and which opens out into the top part 16 of the reservoir 11.

In this method of construction, it appears then that the reference chamber 81 is at the same pressure as the top part 16 of the reservoir 11 due to the existence of the pipe 85. This pressure is also the same as that which reigns in the compensation chamber 48 due to the pipe 44.

During a rapid compression movement of the shock absorber, the pressure of the hydraulic fluid increases in the intermediate space 90 until it acts on the flexible diaphragm 83 causing the opening of the valve 88. The maximum value of the strength of the shock absorber depends on the preload of the spring 89. During a sudden compression, the resilient pad 10 is compressed even before any movement of the rod 3. The result of this is a reduction in the useful volume of the cylindrical tube 71 which causes an increase of the pressure in the intermediate chamber 90 and the opening of the control valve 88. The existence of the valve 93 forming a restriction throttling the flow of the fluid coming from the first chamber 2a sees to it that the damping force does not decrease to a value of practically nil when the valve 88 opens. It will be noted that the static component of the fluid pressure reigning in the intermediate space 90 is applied all over the flexible diaphragm 83 because of the existence of some perforations 87 of the deflector 86. The deflector 86, moreover, channels the flow of the fluid and so prevents the operation of the valve 88 from being upset by the vortices leading to local pressure variations.

Figure 7:
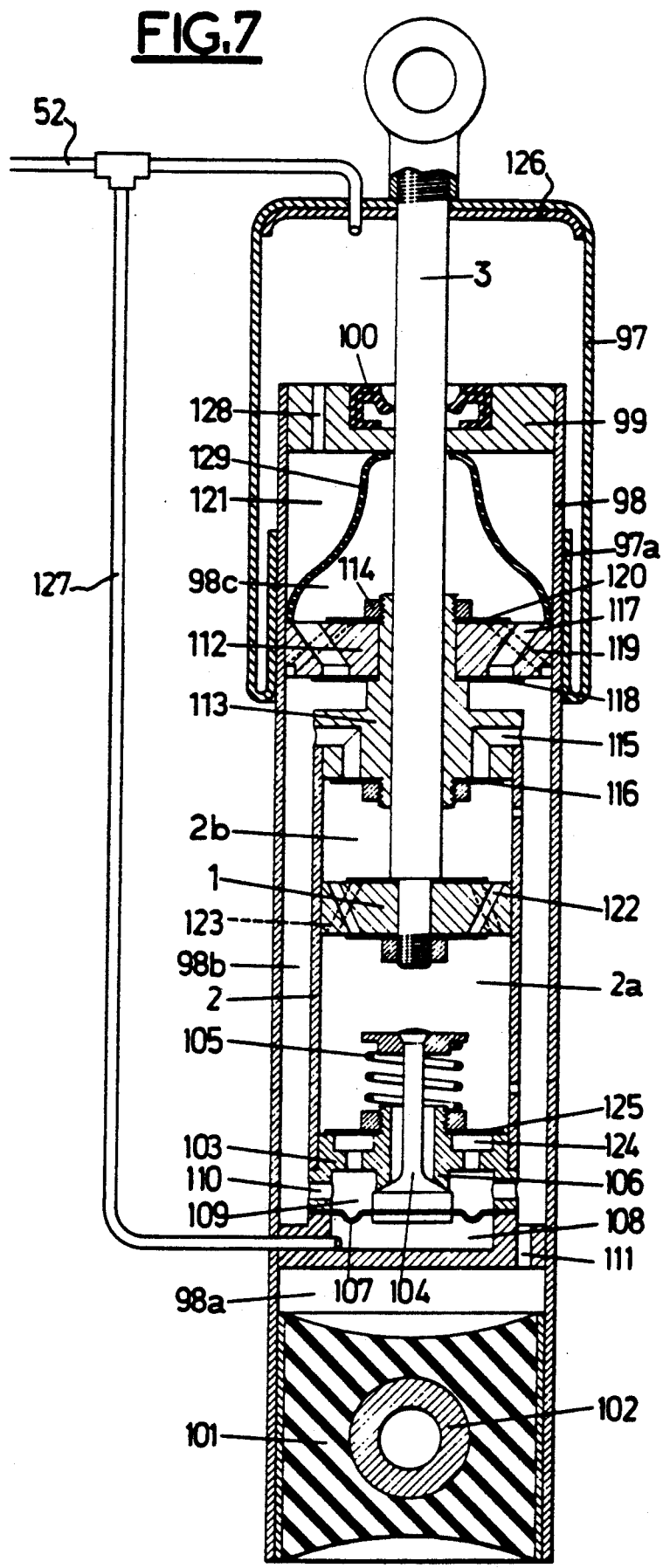

The method of construction illustrated in FIG. 7 relates to a shock absorber according to the invention in a dual tube version, the rod being nevertheless directed upwards. Furthermore, in this method of construction, the rigid external compensation casing of the preceding methods of construction is replaced by a sleeve 97 made of a nonextendable flexible material.

The parts identical to the preceding methods of construction have the same references.

In this method of construction, the cylinder 2 is located inside a cylindrical tube 98 having a closure cap 99 at its top end fitted with a sealing ring 100 permitting the passage and the sealed sliding of the rod 3 of the piston 1. The bottom part of the cylindrical tube 98 is occupied by a resilient pad of elastomer 101 integral with the inside wall of the tube 98 and holding an attachment device 102 for the shock absorber. The resilient pad 101 plays the same part as the resilient pad 10 of the preceding methods of construction.

The bottom end of the cylinder 2 is blanked off by a bottom closure part 103 fitted with a control valve 104 which is closed by the action of a return spring 105 which presses it on the seat 106. A flexible diaphragm 107 is fixed on the control valve 104 and is mounted inside the closure part 103 so as to define a closed reference chamber 108 whose flexible diaphragm 107 forms a moving wall. An intermediate space 109 communicates with an annular space 98b located between the cylinder 2 and the cylindrical tube 98 by means of the passages 110. Passages 111 permit the communication between the annular space 98b and a zone 98a filled with fluid and demarcated by the top face of the resilient pad 101 which plays the part of sealing for the bottom end of the tube 98.

The annular space 98b is limited at its top part by a separating bulkhead 112 connected to a top closure part 113 which blanks off the top end of the cylinder 2 and which comprises a central bore through which the rod 3 slides. A nut 114 permits the fixing of the separating bulkhead 112 on the top closure part 113. This latter has passages 115 working together with a very flexible non-return valve 116 which plays a part similar to the valve 21 of the method of construction of FIG. 1 and allows the passage of the hydraulic fluid from the annular space 98b towards the second chamber 2b of the cylinder 2.

In the same way, the separating bulkhead 112 comprises passages 117 working together with a very flexible non-return valve as well as passages 119 working together with a more rigid non-return valve 120 permitting respectively a circulation solely in a direction between the annular space 98b and the reservoir of hydraulic fluid 98c located at the top part of the tube 98, which comprises partly fluid and partly gas 121 separated by a flexible diaphragm 129.

The shock absorber is completed by passages 122 and 123 working together with non-return valves arranged in the piston 1 itself of massive structure. Finally, passages 124 working together with a non-return valve 125 permitting an additional passage of fluid from the intermediate space 109 towards the first chamber 2a inside the component 103.

The sleeve 97 comprises an open end 97a fixed at its top with sealing material round the tube 98 and which may roll on this during the movement of the whole of the shock absorber in relation to the sleeve 97. The sleeve 97 is fixed to a rigid collar 126 integral with the top end of the rod 3 by its top front face. The reference chamber 108 is in communication by means of the pipe 127 with the compensation chamber defined inside the flexible sleeve 97. The compensation chamber communicates with the gas 121 of the reservoir 98c by means of a passage 128 made in the component 99. The pressurizing of the system of compensation for the load is made as in the preceding methods of construction by means of the pipe 52 which runs directly into the sleeve 97.

The operation of the shock absorber illustrated on FIG. 7 is similar to that of the preceding methods of construction. During a sudden compression of the shock absorber, the resilient pad 101 causes a reduction of the useful volume of the space 98a and thus an action on the control valve 104. Furthermore, a rapid movement of compression of the rod leads, above a certain speed, to the opening of the control valve 104 so reducing the damping force.

The operation of the shock absorber remains identical irrespective of the load applied to the suspension due to the presence of the gas in the flexible sleeve 97 playing the part of compensation chamber.

The embodiment of FIG. 8 is a variation of the MacPherson type suspension. It is essentially the same as the FIG. 4 embodiment, except the elastic member 10 which defines an end of the chamber 2a is located inside the shock absorber. The upper components of this embodiment have sizes corresponding to those of FIG. 1.

The embodiment of FIG. 9 corresponds to the construction shown in FIG. 1 except that the external compensation casing is a non-extendible flexible sleeve 46a which is sealed and fixed to the shock absorber and may roll on it during compensation of the load.

I claim:

1. A shock absorber device for an automotive vehicle comprising a cylinder containing a hydraulic fluid;
   a piston located in and dividing said cylinder into a first chamber and a second chamber;
   a rod connected to said piston and extending through said second chamber for actuating said piston in said cylinder;
   means defining a hydraulic fluid reservoir;
   flow restriction means providing fluid communication between said hydraulic fluid reservoir and said first chamber and causing the pressure in the first chamber to increase in response to piston movement toward the first chamber;
   a spring biased control valve on said piston, coupling said first and second chambers;
   means defining a reference chamber containing a reference fluid, including a movable wall member integrally connected to said control valve such that movement of said wall member causes a corresponding opening of said control valve in response to a rapid compression movement of the shock absorber;
   means defining an elastic member for mounting said cylinder, said elastic member comprising a first portion defining a limit surface of said first chamber and subjected to the pressure of said first chamber and a second portion outside of said first chamber;
   means providing an external casing integrally connected with said rod and sealingly enclosing said cylinder for sliding movements within said casing;
   and means for communicating said external casing, said reference chamber and said fluid reservoir with a common source of variable pressure so a pressure variation in said external casing results in a corresponding pressure variation in said first chamber during rapid compression movement of the shock absorber, acting on said first portion of the elastic member, such that said elastic member is deformed depending on the ratio between the cross section of the cylinder and the cross section of the first portion of the elastic member.

2. A shock absorber according to claim 1 wherein the external casing has a first part containing a gas, and a second part containing hydraulic fluid, said second part being in communication with the reservoir.

3. A shock absorber according to claim 1 wherein the reference chamber contains hydraulic fluid and communicates with the reservoir.

4. A shock absorber according to claim 1 wherein the elastic member is a resilient pad fixed inside the shock absorber to reduce the useful volume of the shock absorber, causing the control valve to open during a sudden compression movement.

5. A shock absorber according to claim 4 wherein the resilient pad is eccentric relative to the external casing so as to create a couple.

6. A shock absorber according to claim 1 wherein at least one sealing ring is fitted between the external casing and the cylinder.

7. A shock absorber according to claim 6 wherein there are two said sealing rings with a free space between them.

8. A shock absorber according to claim 7 wherein the free space is filled with hydraulic fluid and placed in communication with the external casing.

9. A shock absorber according to claim 1 wherein the external casing is made of a non-stretching flexible sleeve having an open end which is fixed on the cylinder in a sealed manner and which can roll on the cylinder during operation.

10. A shock absorber according to claim 1 wherein the control valve is mounted in the piston.

11. A shock absorber according to claim 1 wherein the rod is hollow and permits communication between the reference chamber, the external compensation chamber and the reservoir.

12. A shock absorber according to claim 1 wherein the reservoir is located at the top end of the shock absorber and is connected by the elastic member to the cylinder of the shock absorber, said rod being located at the bottom end of the shock absorber and being fixed rigidly to the external casing and to wheels of the vehicle.

13. A shock absorber according to claim 1 wherein an additional restriction is placed in the hydraulic fluid coming from the first chamber during a rapid compression movement of the rod leading to the opening of the control valve.

14. A shock absorber according to claim 1 in combination with an automobile vehicle suspension of the MacPherson type having a main spring which surrounds the shock absorber and rests on a collar integral with the external compensation causing, the pressure of the external casing being supplied by a said common source of variable pressure gas which is controlled by a positioning sensor for the body height of the vehicle in relation to the ground.

15. A shock absorber according to claim 1 in combination with an automobile vehicle suspension devoid of springs, the shock absorber providing the entire suspension on its own, said common source of variable pressure gas being controlled by a positioning sensor for the body height of the vehicle in relation to the ground.

16. A shock absorber according to claim 1 wherein the reference chamber contains a gas.

17. In a shock absorber device for an automotive vehicle of the type comprising a cylinder containing a hydraulic fluid;
a piston located in and dividing said cylinder into a first chamber and a second chamber;
a rod connected to said piston and extending through said second chamber for actuating said piston in said cylinder;
means defining a hydraulic fluid reservoir;
flow restriction means providing fluid communication between said hydraulic fluid reservoir and said first chamber and causing the pressure in the first chamber to increase in response to piston movement toward the first chamber;
a spring biased control valve on said piston, said control valve being movable during rapid compression movement of said piston from a closed position to an open position at which said first chamber is in communication with said second chamber, said control valve having surfaces exposed to pressures of the fluid in the first and second chambers;
a substantially fluid tight reference chamber on said piston containing a substantially constant pressure gas for biasing the control valve toward its closed position;
said control valve and said reference chamber acting as pressure control means operable to provide damping forces which decrease progressively when the compression rate increases;
an elastic member for fastening said damping device to a part of the vehicle, said elastic member having a first portion defining an end of said first chamber and a second portion outside of said first chamber whereby the pressure of the hydraulic fluid increases to open said control valve in case of a rapid compression stroke;
means providing an external casing integrally connected with said rod and sealingly enclosing said cylinder for sliding movements of said cylinder within said casing; and,
means for subjecting said external casing, said reference chamber and said fluid reservoir to the same gas pressure of an external source of variable pressure gas so a pressure variation in said external casing results in a corresponding pressure variation in said first chamber during rapid compression movement of the shock absorber, acting on said first portion of the elastic member, such that said elastic member is deformed depending on the ratio between the cross section of the cylinder and the cross section of the first portion of the elastic member.

18. A shock absorber according to claim 17 wherein the external casing has a first part containing a gas, and a second part containing hydraulic fluid, said second part being in communication with the reservoir.

19. A shock absorber according to claim 17 wherein the elastic member is a resilient pad fixed inside the shock absorber to reduce the useful volume of the shock absorber, causing the control valve to open during a sudden compression movement.

20. A shock absorber according to claim 19 wherein the resilient pad is eccentric relative to the external casing so as to create a couple.

21. A shock absorber according to claim 17 wherein at least one sealing ring is fitted between the external casing and the cylinder.

22. A shock absorber according to claim 21 wherein there are two said sealing rings with a free space between them.

23. A shock absorber according to claim 22 wherein the free space is filled with hydraulic fluid and placed in communication with the external casing.

24. A shock absorber according to claim 17 wherein the external casing is made of a non-stretching flexible sleeve having an open end which is fixed on the cylinder in a sealed manner and which can roll on the cylinder during operation.

25. A shock absorber according to claim 17 wherein the control valve is mounted on the piston.

26. A shock absorber according to claim 17 wherein the rod is hollow and permits communication between the reference chamber, the external compensation chamber and the reservoir.

27. A shock absorber according to claim 17 wherein the reservoir is located at the top end of the shock absorber and is connected by the elastic member to the cylinder of the shock absorber, said rod being located at the bottom end of the shock absorber and being fixed rigidly to the external casing and to wheels of the vehicle.

28. A shock absorber according to claim 17 wherein an additional restriction is placed in the hydraulic fluid coming from the first chamber during a rapid compression movement of the rod leading to the opening of the control valve.

29. A shock absorber according to claim 17 in combination with an automobile vehicle suspension of the MacPherson type having a main spring which surrounds the shock absorber and rests on a collar integral with the external compensation casing, the pressure of the external casing being supplied by a said common source of variable pressure gas which is controlled by a positioning sensor for the body height of the vehicle in relation to the ground.

30. A shock absorber according to claim 17 in combination with an automobile vehicle suspension devoid of springs, the shock absorber providing the entire suspension on its own, said common source of variable pressure gas being controlled by a positioning sensor for the body height of the vehicle in relation to the ground.

31. A shock absorber device for an automotive vehicle comprising an outer envelope containing a hydraulic fluid;
- a cylinder mounted within said outer envelope and communication therewith;
- a piston defining within said cylinder a first chamber and a second chamber;
- a rod connected to said piston and extending through said second chamber for actuating said piston;
- means defining a hydraulic fluid reservoir;
- flow restriction means providing fluid communication between said hydraulic fluid reservoir and said first chamber;
- a spring biased control valve coupling said first and second chambers;
- means defining a reference chamber containing a gas, including a movable wall member integrally connected to said control valve such that movement of said wall member causes a corresponding opening of said control valve in response to a rapid compression movement of the shock absorber;
- means defining an elastic member so mounted within said envelope as to transmit the damping forces to said envelope, said elastic member comprising a first portion defining a limit surface of said envelope and subjected to the pressure in said envelope and a second portion outside of said envelope;
- means providing an external casing integrally connected with said rod and sealingly enclosing said envelope for sliding movements within said casing; and,
- means for communicating said external casing, said reference chamber and said fluid reservoir with a common source of variable pressure gas so a pressure variation in said external casing results in a corresponding pressure variation in said envelope during rapid compression movement of the shock absorber, acting on said first portion of the elastic member, such that said elastic member is deformed depending on the ratio between the cross section of the cylinder and the cross section of the first portion of the elastic member.

32. A shock absorber according to claim 31 wherein the external casing has a first part containing a gas, and a second part containing hydraulic fluid, said second part being in communication with the reservoir.

33. A shock absorber according to claim 31 wherein the elastic member is a resilient pad fixed inside the shock absorber to reduce the useful volume of the shock absorber, causing the control valve to open during a sudden compression movement.

34. A shock absorber according to claim 33 wherein the resilient pad is eccentric relative to the external casing so as to create a couple.

35. A shock absorber according to claim 31 wherein at least one sealing ring is fitted between the external casing and the outer envelope.

36. A shock absorber according to claim 35 wherein there are two said sealing rings with a free space between them.

37. A shock absorber according to claim 36 wherein the free space is filled with hydraulic fluid and placed in communication with the external casing.

38. A shock absorber according to claim 31 wherein the external casing is made of a non-stretching flexible sleeve having an open end which is fixed on the outer envelope in a sealed manner and which can roll on the outer envelope during operation.

39. A shock absorber according to claim 31 wherein the reservoir is located at the top end of the shock absorber and is connected by the elastic member to the outer envelope of the shock absorber, said rod being located at the bottom end of the shock absorber and being fixed rigidly to the external casing and to wheels of the vehicle.

40. A shock absorber according to claim 31 wherein the reservoir is located at the top end of the shock absorber, a rod passing through the reservoir and being fixed rigidly to a vehicle body, the shock absorber having a bottom part fixed to wheels of the vehicle by said resilient member.

41. A shock absorber according to claim 31 wherein an additional restriction is placed in the hydraulic fluid coming from the first chamber during a rapid compression movement of the rod leading to the opening of the control valve.

42. A shock absorber according to claim 31 in combination with an automobile vehicle suspension of the MacPherson type having a main spring which surrounds the shock absorber and rests on a collar integral with the external compensation casing, the pressure of the external casing being supplied by a said common source of variable pressure gas which is controlled by a positioning sensor for the body height of the vehicle in relation to the ground.

43. A shock absorber according to claim 31 in combination with an automobile vehicle suspension devoid of springs, the shock absorber providing the entire suspension on its own, said common source of variable pressure being controlled by a positioning sensor for the body height of the vehicle in relation to the ground.

* * * * *